Figure 5:
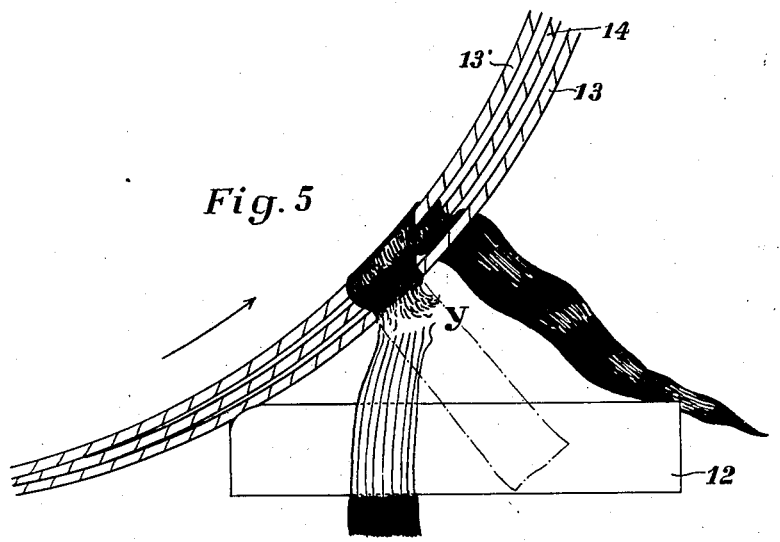

Feb. 24, 1931.  K. ERB  1,794,065
DECORTICATING AND DEPULPING MACHINE AND METHOD
Filed May 17, 1929  2 Sheets-Sheet 1
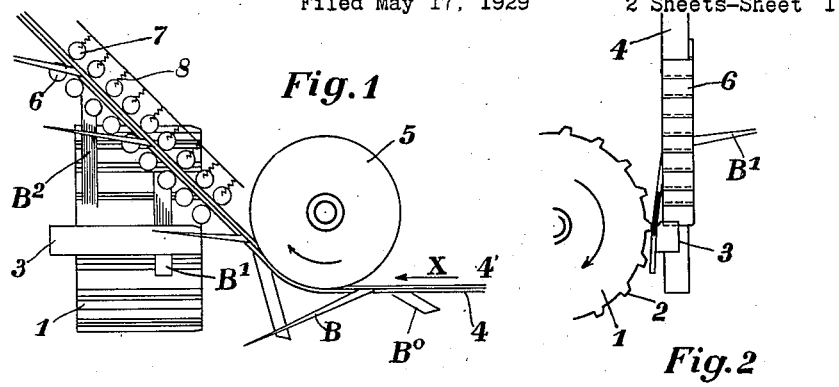
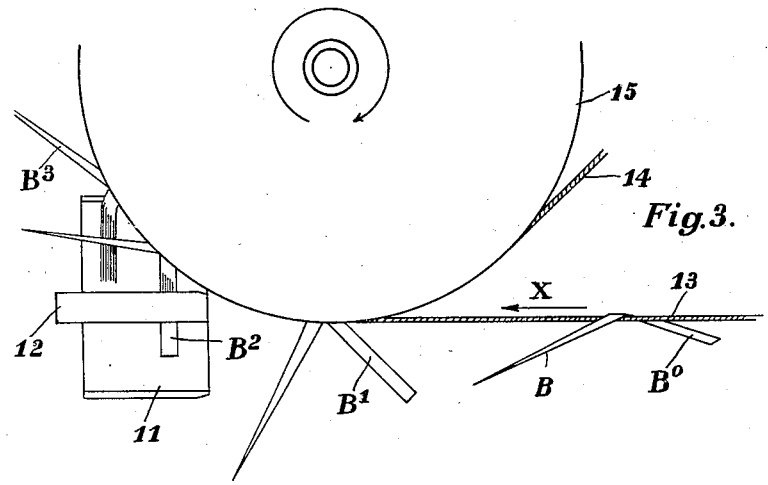
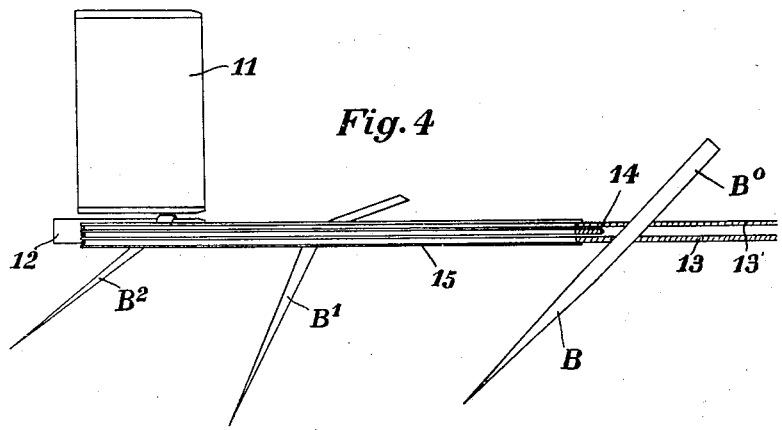
INVENTOR
KARL ERB
BY *Karl Viertel*
ATTORNEY Feb. 24, 1931.  K. ERB  1,794,065
DECORTICATING AND DEPULPING MACHINE AND METHOD
Filed May 17, 1929  2 Sheets-Sheet 2

INVENTOR
KARL ERB
BY Karl Viertel
ATTORNEY

Patented Feb. 24, 1931

1,794,065

UNITED STATES PATENT OFFICE

KARL ERB, OF FRANKFORT-ON-THE-MAIN-GRIESHEIM, GERMANY

DECORTICATING AND DEPULPING MACHINE AND METHOD

Application filed May 17, 1929, Serial No. 363,834, and in Germany September 1, 1927.

My invention relates to the problem of effectively and economically decorticating the leaves of fibrous plants and more particularly of Yuccacænas and Dracænas and plants of kindred genus the leaves of which are known to have skins of a very tough and leathery nature, difficult to decorticate.

It is common practice in depulping Yuccacænas, etc., to introduce the leaves by hand in their longitudinal direction downwardly into the working space between the stripping drums and their counterbeams, viz, in a direction corresponding to the circumferential path of the stripping knives.

The leaves after having thus been depulped are then longitudinally withdrawn in the opposite direction, which manipulation entailed the disadvantage that the period of time while the leaves are withdrawn is lost and the output is correspondingly reduced.

The principal object of the invention is to provide an improved machine for the particular purpose set forth in which the leaves under treatment are passed only in one direction through the working space between the drum and its counterbeam with the result that a larger quantity of leaves can be depulped in a relatively short period of time and the output of the machine is considerably increased.

Another object of the invention is to render the manipulation of the leaves less dangerous to the attendants by providing an improved depulping machine having a mechanism for automatically gripping and carrying the leaves into the machine and conveying them past the stripping drums.

In my co-pending patent applications, Ser. Nos. 353,133 and 363,835, machines designed for decorticating fibre-containing plants and particularly the leaves of Yuccacænas and Dracænas are described, having rotary stripping drums associated with leaf supporting members or counterbeams of relatively small width when compared with the circumference of the stripping drums, the object of this feature being to expose only a limited section of the leaves to the action of the knives of the said drums so as to gently and gradually decorticate the leaves inch by inch and to prevent an undue straining of the fibres and breaking them into short pieces of little commercial value.

My invention further aims at providing an improved method of conveying the leaves through machines of said type i. e. having a leaf supporting member of relatively small width when compared with the circumference of the stripping drum: According to the invention the leaves are carried through the working space between the stripping drum and its counterbeam of limited width in an ascending path.

Decorticating machines are known per se in the art having two pairs of stripping drums cooperating with each other between which the leaves are decorticated on both sides simultaneously and are conveyed through the working space between the said drums in an ascending path.

As a matter of fact known to practitioners machines of this double drum type cannot be used in practice for decorticating leaves of the Yuccacæna-class and of plants of kindred genus.

The invention aims at providing an improved decorticating machine which is less costly and less complicated than the double drum type machines, and in which Yuccacæna and other leaves can be effectively decorticated in a relatively short time so that a maximum quantity of sound fibres having their full natural length is produced.

According to this invention the leaves—while being carried past the stripping drums by endless conveying ropes in an ascending path—are at the same time presented to the action of the stripping knives in the most convenient and favorable position by inserting the leaves between the conveying ropes in an oblique position to the latter.

Heretofore it has been common practice to place the leaves on the conveying ropes at right angles to the latter. My experiments have shown that this results in unduly bending and breaking the leaves near their clamping point $y$ as indicated in Fig. 5.

I have found that this is due to the fact that the leaf under treatment is forcibly bent by the pulling action of the knives from its initial radial position relatively to the curvature of the conveying ropes into an inclined position relatively to the latter with the result that the whole tensile and bending strain imparted to the leaf is concentrated at its upper section $y$. (See Fig. 5.)

It is one of the main objects of my invention to overcome the said drawback. Other objects of the invention will become incidentally apparent hereinafter.

Figure 6:
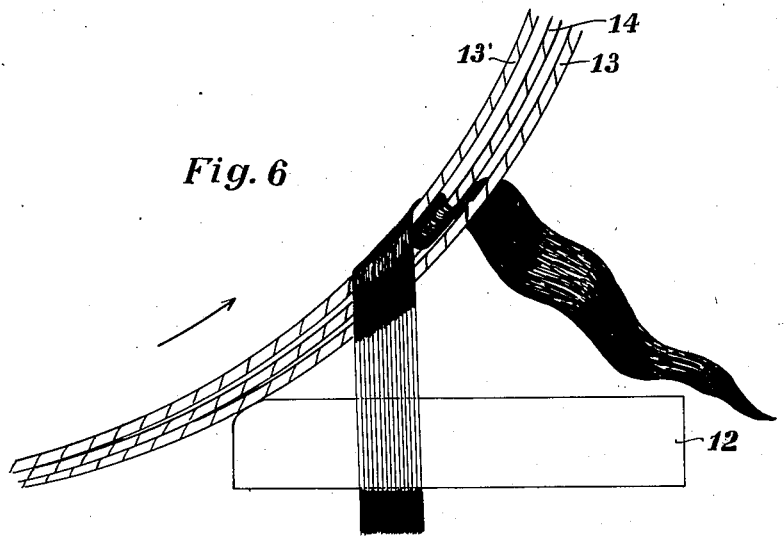

The nature and the scope of my invention are outlined in the appended claims and will be more fully understood by the following specification: and the drawing in which Fig. 1 is a side elevation showing diagrammatically the cooperation of the stripping drum and the conveying means, Fig. 2 is a front elevation corresponding to Fig. 1, Fig. 3 is a side elevation diagrammatically showing a structurally modified conveying mechanism, Fig. 4 is a plan corresponding to Fig. 3, Figs. 5 and 6 illustrate perspectively an undesirable way and the correct manner of positioning the leaves on the conveying mechanism.

The decorticating and depulping machine shown in Figs. 1 and 2 comprises a stripping drum 1 having scraping knives 2 attached thereto, the latter cooperating with a counterbeam 3.

The mechanism for conveying the leaves to be decorticated and depulped into the machine comprises an upper set and a lower set of flexible members such as belts 4, 4', the latter both running under a guide pulley 5 and thence in an upwardly inclined direction past the stripping drum 1. Two sets of guide rollers 6, 7 are provided for pressing the upper and lower conveying belts against each other.

The leaves to be depulped should be introduced into the conveying mechanism in an oblique position relatively to the feeding direction $x$, viz, so that the leaves are engaged and supported near their thick ends with their section B° ready to be depulped first lagging behind the opposite end B of the leaves.

By reason of the oblique position of the leaves relatively to the feeding direction $x$ specified above and by virtue of the upwardly inclined path in which the conveying belts run relatively to the stripping drum, the leaves will pass along the latter with their fibres extending substantially vertically, viz, in the circumferential working direction of the knives of the drum, as seen at $B^1$, $B^2$ in Fig. 1.

The same is true with regard to the structurally modified conveying mechanism shown in Figs. 3 and 4 which comprises one upper conveying rope 14 and two lower conveying ropes 13, 13' running around a guide pulley 15; the latter is provided with circumferential grooves and is arranged in staggered position relatively to the stripping drum 11, so as to drag the leaves through the space between the stripping drum 11, and its counterbeam 12 in an ascending path.

It will be seen from Fig. 6 that the leaves are gradually depulped with their fibres vertically depending freely in the circumferential working direction of the knives of drum 11 (Fig. 3).

Attention is drawn to Fig. 5 from which it can be seen that the leaves would be forcibly bent down, torn and broken at $y$ by the scraping action of the depulping knives in case of the leaves being positioned— as it was usual hitherto—perpendicularly to the conveying direction onto the conveying ropes, viz, not obliquely to the latter as proposed above.

It should be understood that various changes and modifications may be made in the construction and design of decorticating and depulping machines described above and in the assemblage and cooperation of their component parts, without substantially departing from the spirit and the salient ideas of my invention and without sacrificing any of the advantages referred to hereinbefore.

What I claim is:

1. The method of reclaiming fibers from the Yuccacænas, Dracænas, and other plants of kindred genus which consists in feeding the leaves at an oblique angle to the line of travel to a rotating stripping drum, and engaging the leaves with the drum with the fibers thereof disposed transversely to the axis of rotation of said drum, then moving the leaves obliquely across the drum while maintaining a non-movable pressure on the back of the leaves at their area of contact with the stripping drum.

2. A machine for decorticating leaves of the character set forth comprising a rotary stripping drum, a counterbeam associated with said drum, and a conveyor adapted to feed leaves between said counterbeam and drum, said conveyor being positioned with its direction of travel on a line oblique to the axis of said drum and in a vertical plane thereby to enter said leaves between said counterbeam and drum transversely to the direction of the fibers therein and move said leaves longitudinally between said counterbeam and drum.

In testimony whereof I have signed my name to this specification.

KARL ERB.